US012739462B2

(12) United States Patent
Hasegawa et al.

(10) Patent No.: US 12,739,462 B2
(45) Date of Patent: Sep. 15, 2026

(54) DISPLAY VIDEO SELECTION DEVICE, DISPLAY VIDEO SELECTION METHOD AND DISPLAY VIDEO SELECTION PROGRAM

(71) Applicant: NTT, Inc., Tokyo (JP)

(72) Inventors: Keisuke Hasegawa, Tokyo (JP); Takayuki Kurozumi, Tokyo (JP); Shinji Fukatsu, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 19/136,301

(22) PCT Filed: Dec. 14, 2022

(86) PCT No.: PCT/JP2022/046083
§ 371 (c)(1),
(2) Date: Jun. 6, 2025

(87) PCT Pub. No.: WO2024/127565
PCT Pub. Date: Jun. 20, 2024

(65) Prior Publication Data
US 2026/0205646 A1 Jul. 16, 2026

(51) Int. Cl.
*H04N 21/414* (2011.01)
*H04N 21/234* (2011.01)
*H04N 21/266* (2011.01)

(52) U.S. Cl.
CPC . *H04N 21/41415* (2013.01); *H04N 21/23418* (2013.01); *H04N 21/266* (2013.01)

(58) Field of Classification Search
None
See application file for complete search history.

(56) References Cited

U.S. PATENT DOCUMENTS

2013/0014139 A1 1/2013 Kawakami et al.
2017/0264954 A1* 9/2017 Nakagawa ....... H04N 21/44008
(Continued)

FOREIGN PATENT DOCUMENTS

JP 2013-021466 A 1/2013
JP 2019-145939 A 8/2019
JP 2021-179721 A 11/2021

OTHER PUBLICATIONS

Kurozumi et al., "Harmonic Reproduction Technology between a Real Venue and Remote Audiences", NTT Technology Journal, Available Online at: https://journal.ntt.co.jp/wp-content/uploads/2022/09/nttjnl5004_20220901.pdf, vol. 34, No. 9, Sep. 2022, pp. 21-24 (9 pages including English Translation).

*Primary Examiner* — Jason K Lin
(74) *Attorney, Agent, or Firm* — XSENSUS LLP

(57) ABSTRACT

In an embodiment, a display video selection apparatus is a display video selection apparatus for selecting a predetermined number of remote spectator videos to be displayed on a video display apparatus installed at an event venue from among a plurality of remote spectator videos taken at one or more remote venues and transmitted via a communication network, and includes a video status determination unit and a video output content determination unit. The video status determination unit analyzes the remote spectator videos and quantifies the excitement level of the remote spectators shown in the remote spectator video. The video output content determination unit selects the predetermined number of remote spectator videos in descending order of values of the excitement levels.

8 Claims, 6 Drawing Sheets

(56) References Cited

U.S. PATENT DOCUMENTS

| | | | | |
|---|---|---|---|---|
| 2023/0267736 | A1* | 8/2023 | Green | G06V 20/47<br>382/103 |
| 2024/0169976 | A1* | 5/2024 | Mathada | H04N 21/2187 |
| 2024/0179266 | A1* | 5/2024 | Nakai | H04N 5/2624 |
| 2025/0294223 | A1* | 9/2025 | Shimizu | H04N 21/25866 |

* cited by examiner

Fig. 3

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

104A

DISPLAY VIDEO SELECTION DEVICE, DISPLAY VIDEO SELECTION METHOD AND DISPLAY VIDEO SELECTION PROGRAM

CROSS-REFERENCE TO RELATED APPLICATION

This application is a national stage application, pursuant to 35 U.S.C. § 371, of International Patent Application No. PCT/JP2022/046083, filed Dec. 14, 2022, the entire contents of which are incorporated herein by reference.

TECHNICAL FIELD

An aspect of the present invention relates to a display video selection apparatus, a display video selection method, and a display video selection program.

BACKGROUND ART

In recent years, a video and audio playback apparatus that digitizes a video and audio taken and recorded at a certain point, transmits the video and the audio to a remote location in real time via a communication line such as an internet protocol (IP) network, and plays back the video and the audio at the remote location has been used. For example, event video distribution, public viewing, or the like in which video and audio from an event held at an event venue such as a sports stadium, a concert venue, or a fashion show venue are transmitted to a remote location in real time is actively performed.

Such video and audio transmission is not limited to one-to-one unidirectional transmission, and bidirectional transmission is also performed. In bidirectional transmission, for example, video and audio are transmitted from an event venue where a concert is being held to one or more remote venues at remote locations, and output from a monitor or large video display apparatus and speakers at each remote venue. A video and audio such as cheers of spectators at the remote venues (hereinafter referred to as remote spectators) enjoying an event are taken and recorded, transmitted to the event venue, collected at the event venue, and output from a large display and speakers. Through such bi-directional video and audio transmission, performers, athletes, and spectators at the event venue can feel a sense of presence and unity as if the remote spectators were in the same space (event venue) and had the same experience even though the remote spectators are physically far away.

NPL 1 proposes that, when motion of penlights in a video of a plurality of remote spectators (hereinafter referred to as a remote spectator video) is faster, a likelihood of excitement of the remote spectators is considered to be higher, and cheering sounds corresponding to the excitement are played back.

CITATION LIST

Non Patent Literature

[NPL 1] Takayuki Kurozumi, Keisuke Hasegawa, Eiichiro Matsumoto, Toshihiko Eura, Shinji Fukatsu, “Technology for reproducing harmony between real venue and remote spectator,” NTT Technical Journal, September 2022 edition, Sep. 1, 2022, Internet <URL: https://journal.ntt.co.jp/wp-content/uploads/2022/09/nttjn15004 20220901.pdf>

SUMMARY OF INVENTION

Technical Problem

Meanwhile, in terms of display, a plurality of remote spectator videos are displayed simultaneously on a large display at an event venue, for example, in a 5×5 tile array. Therefore, when the number of remote spectator videos transmitted from the remote venue exceeds the number that can be displayed simultaneously on the large display, it is necessary to select the remote spectator videos to be displayed according to this limited number of displays. When the remote spectator videos displayed on the large display are videos of remote spectators at a higher excitement level, an excitement level of the spectators or the like at the event venue is improved.

To create excitement with the remote spectator videos, it is better if all the remote spectator videos to be displayed show excitement, but all of the remote spectators do not make motions that show excitement at the right timing. Further, problems with a communication environment can cause videos to be disturbed. To prevent such videos inappropriate for creation of excitement from being displayed at the event venue, a person performs an operation for visually discriminating the videos and manually switching between the videos to be displayed, but there is a limit to the number of videos that the person can process.

It is conceivable to use a scheme as disclosed in NPL 1 in selection of remote spectator videos, but there are a plurality of points to be considered as described above in addition to the motion of the penlight when discrimination as to whether or not a video is appropriate for creation of excitement.

The present invention has been made in light of the above circumstances, and an object thereof is to provide a technology for making it possible to select a remote spectator video with a higher excitement level from among a plurality of remote spectator videos.

Solution to Problem

In an embodiment of the present invention, a display video selection apparatus is a display video selection apparatus for selecting a predetermined number of remote spectator videos to be displayed on a video display apparatus installed at an event venue from among a plurality of remote spectator videos taken at one or more remote venues and transmitted via a communication network, and includes a video status determination unit and a video output content determination unit. The video status determination unit analyzes the remote spectator videos and quantifies the excitement level of the remote spectators shown in the remote spectator video. The video output content determination unit selects the predetermined number of remote spectator videos in descending order of values of the excitement levels.

Advantageous Effects of Invention

According to an aspect of the present invention, it is possible to select remote spectator videos with a higher excitement level from among the plurality of remote spectator videos.

BRIEF DESCRIPTION OF DRAWINGS

FIG. 3 is a schematic diagram illustrating an example of a display array of remote spectator videos.

DESCRIPTION OF EMBODIMENTS

Hereinafter, several embodiments of the present invention will be described with reference to the drawings.

First Embodiment

Configuration Example

Figure 1:
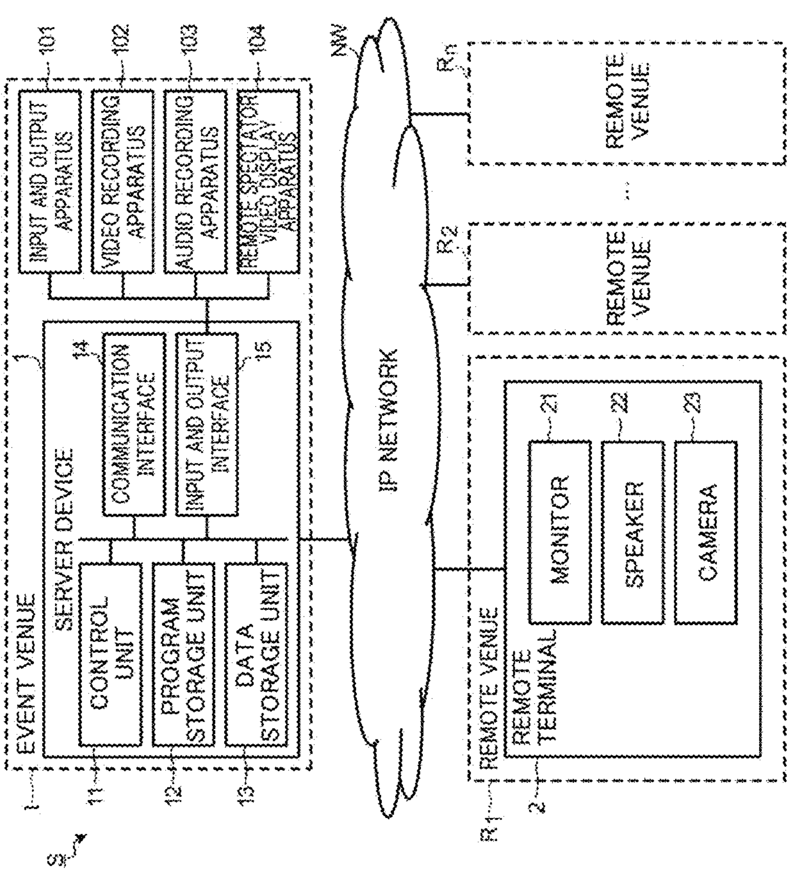
FIG. 1 is a block diagram illustrating an example of a hardware configuration of each electronic device included in an event video display system to which a display video selection apparatus according to a first embodiment of the present invention is applied.

FIG. 1 is a block diagram illustrating an example of a hardware configuration of each electronic device included in an event video display system S to which a display video selection apparatus according to a first embodiment of the present invention is applied.

The event video display system S includes a plurality of electronic devices included in an event venue I, and a plurality of electronic devices included in each of one or more (n in FIG. 1) remote venues $R_1$ to $R_n$. The electronic devices in the event venue I and the remote venues $R_1$ to $R_n$ can communicate with each other via an IP network NW.

The event venue I includes a server apparatus 1, an input and output apparatus 101, a video capturing apparatus 102, an audio recording apparatus 103, and a remote spectator video display apparatus 104.

The server apparatus 1 is an electronic device that controls each electronic device included in the event venue I. The server apparatus 1 is an example of the display video selection apparatus according to the first embodiment of the present invention.

The input and output apparatus 101 is a user interface for an operator of the server apparatus 1, and includes an input apparatus such as a keyboard or a pointing device such as a mouse, and a display apparatus such as a monitor. The operator of the server apparatus 1 can be an event manager, a video director, a switcher who receives instructions from these, or the like.

The video capturing apparatus 102 is an apparatus including a camera that takes a video of the event venue I. The video capturing apparatus 102 may include a plurality of cameras.

The audio recording apparatus 103 is an apparatus including a microphone that records audio from the event venue I. The audio recording apparatus 103 may include a plurality of microphones.

The remote spectator video display apparatus 104 is an apparatus including a large display that plays back and displays a predetermined number of remote spectator videos transmitted from the remote venues $R_1$ to $R_n$ to the event venue I. The display is, for example, a liquid crystal display. The remote spectator video display apparatus 104 is an example of the video display apparatus. For example, in a concert, the remote spectator video display apparatus 104 can be installed behind performers on a stage where the performers, such as musicians and singers, stand. Furthermore, in a sports stadium, the remote spectator video display apparatus 104 is often installed at a position away from an athlete.

An example of a configuration of the server apparatus 1 at the event venue I will be described.

The server apparatus 1 includes a control unit 11, a program storage unit 12, a data storage unit 13, a communication interface 14, and an input and output interface 15. The elements included in the server apparatus 1 are connected to each other via a bus.

The control unit 11 corresponds to a core unit of the server apparatus 1. The control unit 11 includes a processor such as a central processing unit (CPU). The processor may be a multi-core/multi-threaded one, and can execute a plurality of processes in parallel. The control unit 11 includes a read only memory (ROM) as a non-volatile memory area. The control unit 11 has a random access memory (RAM) as a volatile memory area. The processor loads a program stored in the ROM or the program storage unit 12 into the RAM. The control unit 11 realizes each of functional units to be described below by the processor executing the program loaded into the RAM. The control unit 11 constitutes a computer.

The program storage unit 12 includes a non-volatile memory on which writing and reading can be performed at any time, such as a hard disk drive (HDD) or a solid state drive (SSD), as a storage medium. The program storage unit 12 stores programs necessary for execution of various control processes. For example, the program storage unit 12 stores a program that causes the server apparatus 1 to execute processing of each of functional units to be described later, which are realized by the control unit 11. The program storage unit 12 is an example of a storage.

The data storage unit 13 includes a non-volatile memory on which writing and reading can be performed at any time, such as an HDD or an SSD, as a storage medium. The data storage unit 13 is an example of a storage or storage unit.

The communication interface 14 includes various interfaces that communicatively connect the server apparatus 1 to other electronic devices using a communication protocol defined by the IP network NW.

The input and output interface 15 is an interface that enables communication with each of the server apparatus 1, the input and output apparatus 101, the video capturing apparatus 102, the audio recording apparatus 103, and the remote spectator video display apparatus 104. The input and output interface 15 may include an interface for wired communication or may include an interface for wireless communication.

A hardware configuration of the server apparatus 1 is not limited to the above-described configuration. In the server apparatus 1, the above-described components can be appropriately omitted and changed, and new components can be appropriately added.

The remote venue $R_1$ includes a remote terminal 2. The remote venue $R_1$ may be a private home or may be a large facility such as a public viewing venue. When the remote venue $R_1$ is a private home, the remote terminal 2 can be an information processing device such as a personal computer, a television with a network connection function, or the like.

When the remote venue $R_1$ is a public viewing venue or the like, the remote terminal 2 can be the same computer as the server apparatus 1. The remote terminal 2 includes a monitor 21, a speaker 22, and a camera 23.

The monitor 21 plays back and displays a video transmitted from the event venue I to the remote venue $R_1$.

The speaker 22 plays back and outputs audio transmitted from the event venue I to the remote venue $R_1$.

The camera 23 is a camera that films the remote spectators at the remote venue $R_1$ and generates a remote spectator video. The number of cameras 23 at the remote venue $R_1$ is not limited to one, and there may be a plurality of cameras. In that case, the plurality of cameras 23 are installed to film different event spectators.

Since a hardware configuration of a plurality of electronic devices included in each of the remote venues $R_2$ to $R_n$ is the same as that of the remote venue $R_1$ described above, description thereof will be omitted. Hereinafter, when there is no need to distinguish between the remote venues $R_1$ to $R_n$ in the description, the remote venues $R_1$ to $R_n$ are simply be referred to as a remote venue R.

Figure 2:
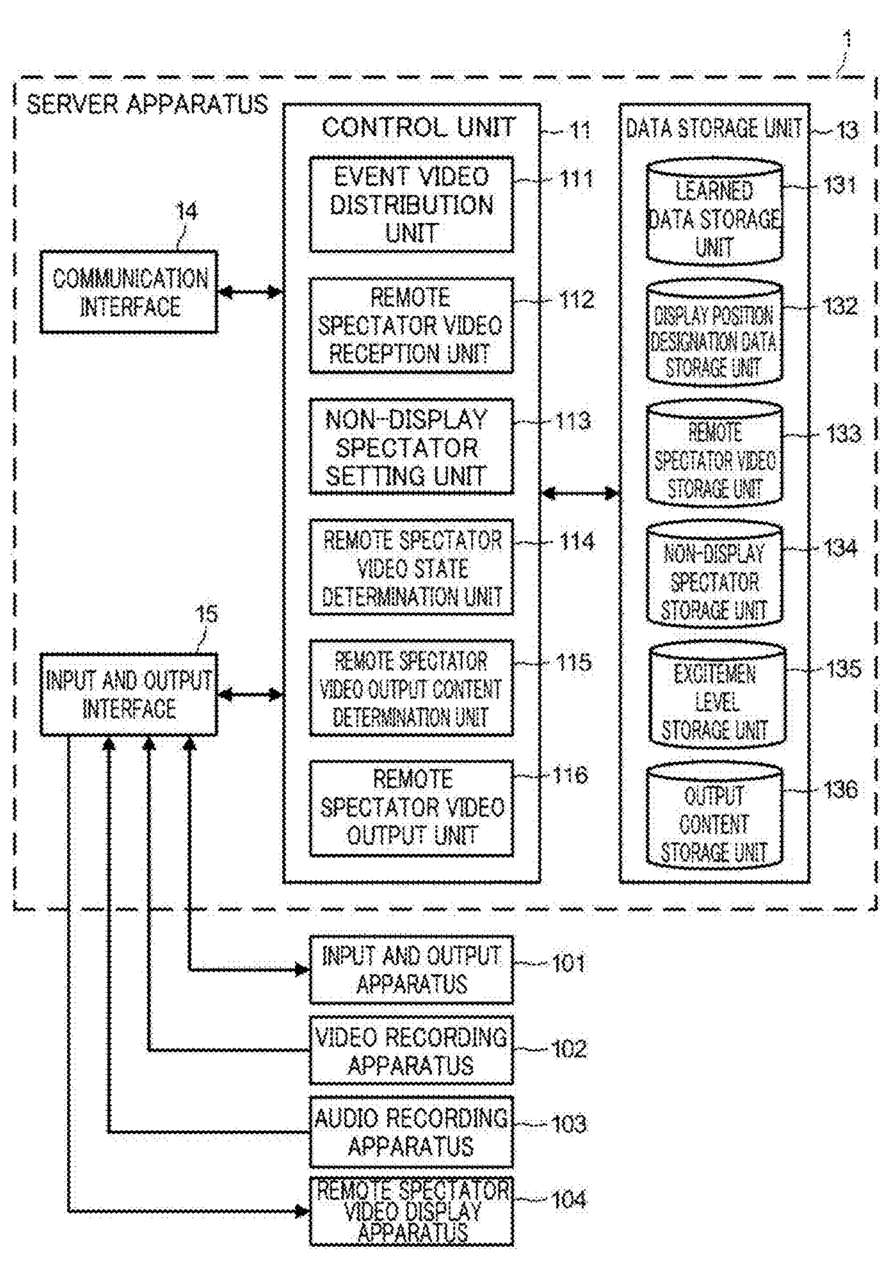
FIG. 2 is a block diagram illustrating an example of a software configuration of a server apparatus as a display video selection apparatus according to the first embodiment.

FIG. 2 is a block diagram illustrating an example of a software configuration of the server apparatus 1 as a display video selection apparatus according to the first embodiment. The server apparatus 1 includes, as functional units, an event video distribution unit 111, a remote spectator video reception unit 112, a non-display spectator setting unit 113, a remote spectator video status determination unit 114, a remote spectator video output content determination unit 115, and a remote spectator video output unit 116. Each functional unit is realized by the control unit 11 executing a program stored in the program storage unit 12. It can also be said that each functional unit is included in the control unit 11 or the processor. Each functional unit can be read as the control unit 11 or the processor. Each functional unit may also be realized in various other forms, including an integrated circuit such as an application specific integrated circuit (ASIC), a digital signal processor (DSP), a field programmable gate array (FPGA), and a graphics processing unit (GPU). Further, the server apparatus 1 includes a learned data storage unit 131, a display position designation data storage unit 132, a remote spectator video storage unit 133, a non-display spectator storage unit 134, an excitement level storage unit 135, and an output content storage unit 136. The learned data storage unit 131, the display position designation data storage unit 132, the remote spectator video storage unit 133, the non-display spectator storage unit 134, an excitement level storage unit 135, and the output content storage unit 136 are realized by the data storage unit 13.

The learned data storage unit 131 stores learned data regarding motions of spectators to be displayed at the event venue I, that is, which motion show excitement, which has been created in advance. As this motion, a motion vector of a person shown in the remote spectator video, that is, the remote spectator himself, a motion vector of an object held by the remote spectator, such as a penlight shown in the video, or the like can be used.

The display position designation data storage unit 132 stores display position designation data indicating a display rule for a plurality of remote spectator videos in the remote spectator video display apparatus 104. FIG. 3 is a schematic diagram illustrating an example of a display array of remote spectator videos to show an example of this rule. In this example, 25 remote spectator videos are in tile array on the display screen 104A of the remote spectator video display apparatus 104. The display position designation data is data for describing a rule indicating at which positions the remote spectator videos are displayed depending on a ranking of the excitement level of the remote spectator. The example in FIG. 3 shows a case where videos are designated to be arranged in a raster scan direction from top left in descending order of levels of excitement.

The event video distribution unit 111 transmits the video output from the video capturing apparatus 102 and the audio output from the audio recording apparatus 103 to each of one or more remote venues R via the IP network NW using the communication interface 14.

The remote spectator video reception unit 112 acquires the remote spectator video transmitted from each remote venue R via the IP network NW, which is received by the communication interface 14. The remote spectator video reception unit 112 stores the acquired remote spectator video in the video storage area for each of the remote venues $R_1$ to $R_n$ secured in the remote spectator video storage unit 133. Alternatively, the remote spectator video reception unit 112 stores the acquired remote spectator video in the remote spectator video storage unit 133 in association with an identifier indicating a corresponding one of the remote venues $R_1$ to $R_n$. The remote spectator video reception unit 112 continues to receive the remote spectator video while it is necessary to display the remote spectator video on the remote spectator video display apparatus 104 at the event venue I. Each remote spectator video is stored for only a predetermined specified time in the remote spectator video storage unit 133, the remote spectator video may be constantly updated and stored, or the remote spectator video may be deleted for a previous specified time each time the remote spectator video for the specified time is accumulated. It is desirable for the number of remote spectator videos to be equal to or greater than the number required for display on the remote spectator video display apparatus 104.

The non-display spectator setting unit 113 receives a designation of a specific remote spectator video through an operation of the input and output apparatus 101 and sets the remote spectator video as a non-display spectator video excluded from the display on the remote spectator video display apparatus 104. The non-display spectator setting unit 113 stores non-display spectator information indicating which remote spectator video has been set as the non-display spectator video in the non-display spectator storage unit 134.

The remote spectator video status determination unit 114 uses the learned data stored in the learned data storage unit 131 to analyze each remote spectator video stored in the remote spectator video storage unit 133, thereby quantifying the excitement level of the remote spectators shown in the remote spectator video. The remote spectator video status determination unit 114 also performs quantifying so that a state clearly inappropriate for display has a low excitement level, in addition to quantifying based on, for example, the motion of the penlight held by the remote spectator. The state clearly inappropriate for display corresponds to a state such as a state in which the remote spectator is directed downward (a line of sight or head is directed downward), a state in which the remote spectator leaves his or her seat (no person is detected in the remote spectator video), or a state in which there is a disturbance in the remote spectator video or a remote spectator video is not displayed (interrupted). The remote spectator video status determination unit 114 stores the quantified excitement level of each remote spectator video in the excitement level storage unit 135.

The remote spectator video output content determination unit 115 selects the remote spectator video to be displayed on the remote spectator video display apparatus 104, based on the ranking of the excitement level stored in the excitement level storage unit 135. In this case, the remote spectator video output content determination unit 115 excludes the remote spectator video from the selection targets even when the remote spectator video has a high ranking of the excitement level, based on the non-display spectator information stored in the non-display spectator storage unit 134. The remote spectator video output content determination unit 115 further determines a disposition position of the selected remote spectator video on the display screen 104A of the remote spectator video display apparatus 104 according to the ranking of the excitement level, in accordance with display designation position data stored at the display position designation data storage unit 132. That is, the remote spectator video output content determination unit 115 determines which remote spectator video is displayed at which position on the display screen 104A of the remote spectator video display apparatus 104. The remote spectator video output content determination unit 115 stores in the output content storage unit 136 output content data indicating a correspondence between the determined disposition position on the display screen 104A and the remote spectator video. The output content data can be, for example, metadata including pairs of an identifier indicating an output position of the remote spectator video and an identifier of each remote spectator video, which correspond to the number of output positions.

The remote spectator video output unit 116 reads the remote spectator videos from the remote spectator video storage unit 133 according to the output content data stored in the output content storage unit 136, and creates an output video in which the remote spectator videos are arranged on one screen. The remote spectator video output unit 116 causes the created output video to be displayed on the remote spectator video display apparatus 104 via the input and output interface 15.

(Example of Operations)

Hereinafter, an example of an operation of the server apparatus 1 as a display video selection apparatus according to the first embodiment of the present invention will be described. Since an operation related to distribution of an event video is the same as in the related art, description thereof will be omitted.

Figure 4:
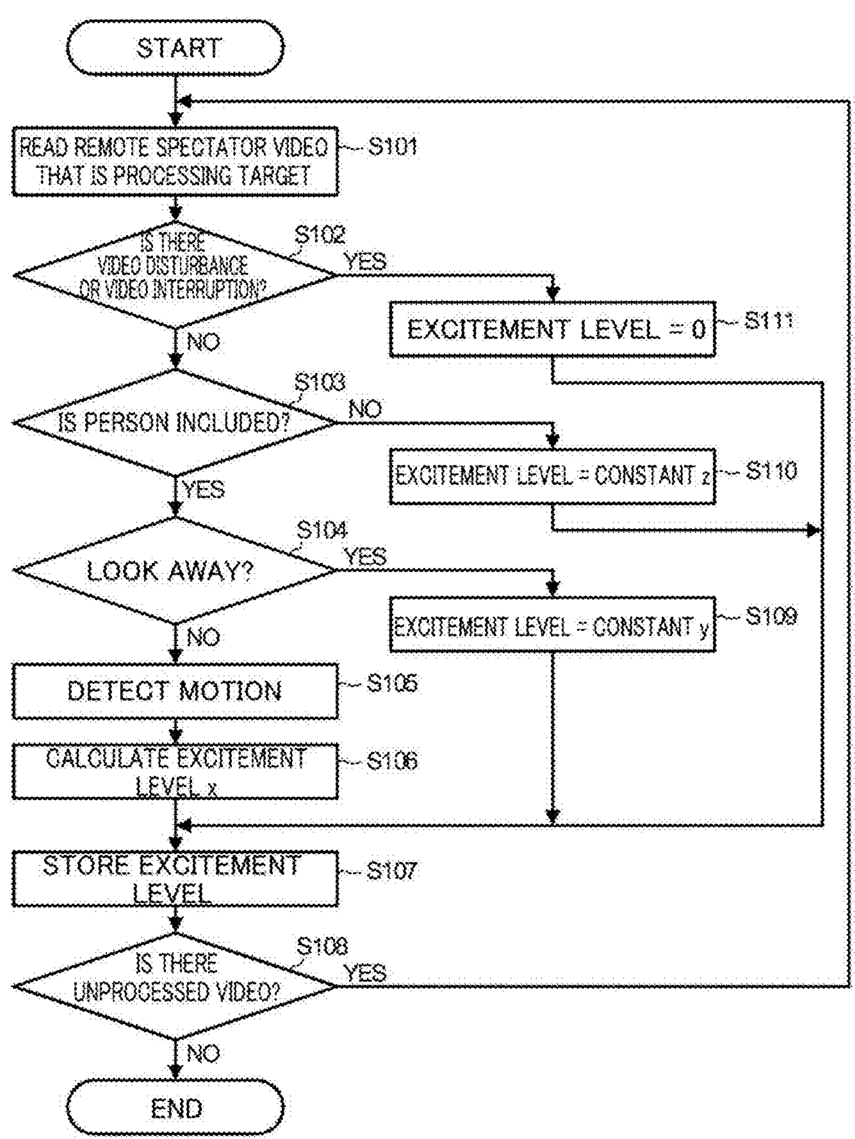
FIG. 4 is a flowchart illustrating a processing procedure and processing content of excitement level calculation processing in the server apparatus.

FIG. 4 is a flowchart illustrating a processing procedure and processing content of the excitement level calculation processing in the server apparatus 1. The server apparatus 1 repeatedly executes the processing shown in this flowchart while the remote spectator video display apparatus 104 is displaying the remote spectator video at the event venue I.

The remote spectator video status determination unit 114 first reads one of the plurality of remote spectator videos stored in the remote spectator video storage unit 133 as the processing target (step S101).

The remote spectator video status determination unit 114 determines whether or not there is any disturbance or interruption in the remote spectator video that is the read processing target (step S102).

Here, when a determination is made that there is no disturbance or interruption in the remote spectator video that is a processing target, the remote spectator video status determination unit 114 further determines whether or not the remote spectator video that is a processing target includes a person (step S103). This determination can be made using a well-known person detection algorithm, or the like.

When a determination is made that the remote spectator video that is a processing target includes a person, the remote spectator video status determination unit 114 further determines whether the person in the remote spectator video that is a processing target is looking away (step S104). This determination can be made using a well-known pupil detection algorithm or the like.

When a determination is made that the person included in the remote spectator video that is a processing target is not looking away, the remote spectator video status determination unit 114 detects a motion of the person or object in the remote spectator video that is a processing target (step S105). This detection can be made using a well-known motion vector detection algorithm or the like.

Further, the remote spectator video status determination unit 114 uses the learned data stored in the learned data storage unit 131 to calculate a value x of the excitement level based on the detected motion (step S106). For example, the remote spectator video status determination unit 114 determines whether the detected motion is a motion to be used for calculation of the excitement level based on the learned data, and sets a magnitude of a motion vector of the detected motion as the excitement level when the detected motion is a motion to be used for calculation of the excitement level.

The remote spectator video status determination unit 114 stores the calculated value x of the excitement level as the excitement level of the remote spectator in the remote spectator video that is the processing target in the excitement level storage unit 135 (step S107).

Then, the remote spectator video status determination unit 114 determines whether there is an unprocessed remote spectator video in the remote spectator video storage unit 133, that is, whether all of the plurality of stored remote spectator videos have been processed as processing targets (step S108).

When a determination is made that there is unprocessed remote spectator video, the remote spectator video status determination unit 114 proceeds to the processing of step S101 and repeats the above processing.

Further, when a determination is made in step S104 that the person included in the remote spectator video that is a processing target is looking away, for example, with a line of sight or head of the person is directed downward, the remote spectator video status determination unit 114 sets the excitement level to a value y (step S109). This value y of the excitement level is set to a constant smaller than the value x calculated in step S106 (that is, x>y). The remote spectator video status determination unit 114 proceeds to the processing of step S107, and stores the value y of the excitement level in the excitement level storage unit 135 as the excitement level of the remote spectator in the remote spectator video that is a processing target.

Further, when a determination is made in step S103 that the remote spectator video that is a processing target does not include a person, that is, that the remote spectator has left his or her seat, the remote spectator video status determination unit 114 sets the value of the excitement level to z (step S110). The value z of the excitement level is a constant smaller than the value y determined in step S109 above (that is, x>y>z). The remote spectator video status determination unit 114 proceeds to the processing of step S107 above, and stores the value z of the excitement level in the excitement level storage unit 135 as the excitement level of the remote spectator in the remote spectator video that is a processing target.

Furthermore, when a determination is made in step S102 that there is the disturbance or interruption in the remote spectator video that is a processing target, the remote spectator video status determination unit 114 sets the value of the excitement level to "0" (step S111). The value z calculated in step S110 is greater than "0" (that is, x>y>z>0).

The remote spectator video status determination unit 114 proceeds to the processing of step S107, and stores the value "0" of the excitement level in the excitement level storage unit 135 as the excitement level of the remote spectator in the remote spectator video that is a processing target.

When the above processing has been performed for all of the plurality of remote spectator videos stored in the remote spectator video storage unit 133, a determination is made in step S108 that there are no unprocessed remote spectator videos, and the remote spectator video status determination unit 114 ends the excitement level calculation processing shown in the flowchart.

As described above, the server apparatus 1 repeatedly executes the processing shown in the flowchart while the remote spectator video display apparatus 104 is displaying the remote spectator videos at the event venue I. Therefore, the remote spectator video status determination unit 114 starts the processing again from step S101.

Figure 5:
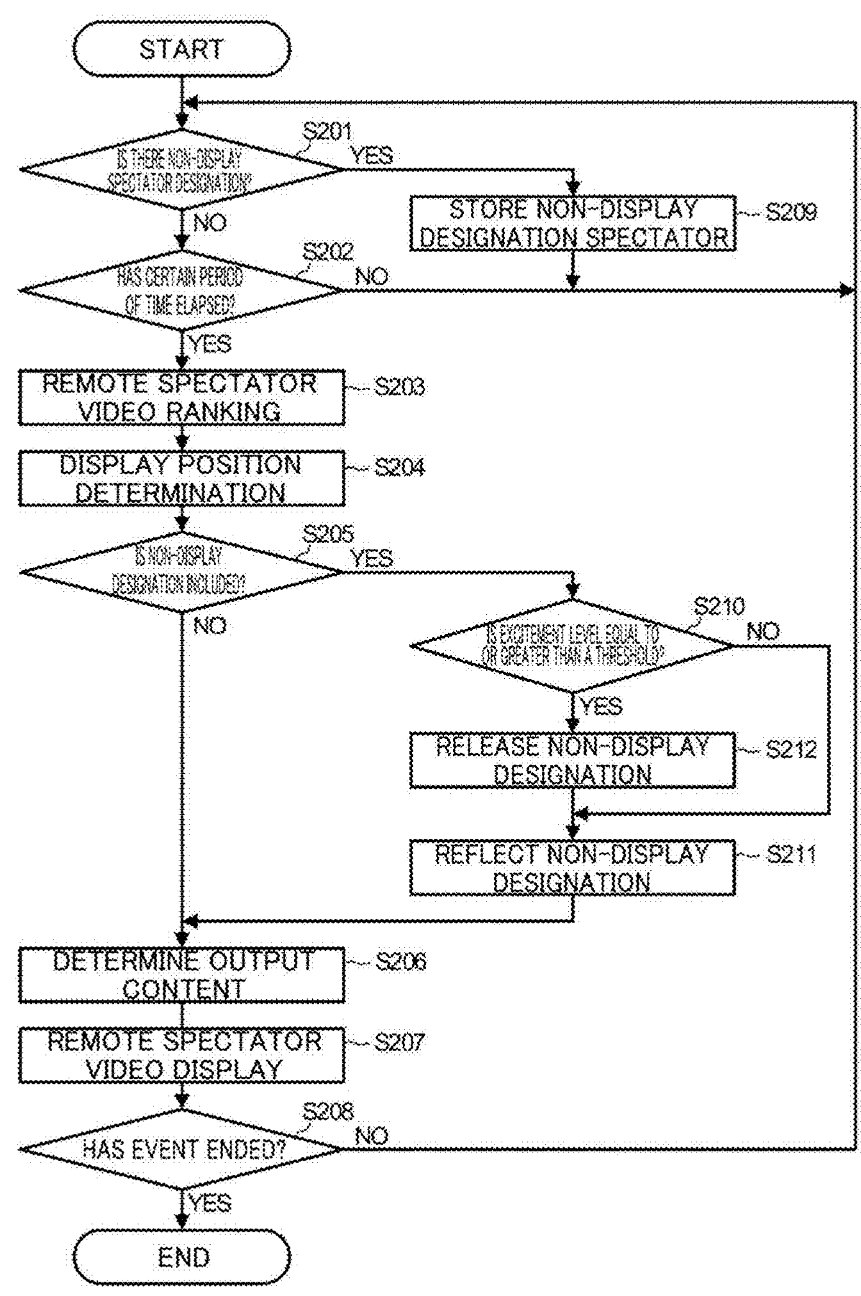
FIG. 5 is a flowchart illustrating a processing procedure and processing content of remote spectator video output processing in the server apparatus.

FIG. 5 is a flowchart illustrating a processing procedure and processing content of the remote spectator video output processing in the server apparatus. When the server apparatus 1 receives an operation to instruct the remote spectator video display apparatus 104 to start displaying the remote spectator video at the input and output apparatus 101, the server apparatus 1 starts the processing shown in the flowchart.

First, the non-display spectator setting unit 113 determines whether or not there is a non-display spectator designation for designating the specific remote spectator video as non-display from the input and output apparatus 101 (step S201).

When a determination is made that there is no non-display spectator designation, the remote spectator video output content determination unit 115 determines whether or not a certain period of time has elapsed (step S202). When a determination is made that the certain period of time has not yet elapsed, the server apparatus 1 proceeds to the processing of step S201.

On the other hand, when a determination is made that the certain period of time has elapsed, the remote spectator video output content determination unit 115 ranks the remote spectator videos in descending order of the values of the excitement levels of the remote spectators of the remote spectator videos stored in the excitement level storage unit 135 (step S203).

The remote spectator video output content determination unit 115 performs a display position determination as to which remote spectator video is assigned to a position of which ranking, according to the display position designation data stored at the display position designation data storage unit 132 (step S204). For example, when there are remote spectator videos for 30 persons, the remote spectator video output content determination unit 115 selects 25 remote spectator videos with a high ranking among the 30 remote spectator videos as remote spectator videos to be displayed in the example illustrated in FIG. 3. The remote spectator video output content determination unit 115 determines a display position for each of the selected remote spectator videos according to the display array on the display screen 104A of the remote spectator video display apparatus 104 illustrated in FIG. 3.

Here, the remote spectator video output content determination unit 115 determines whether or not a remote spectator video for which the display position determination has been performed is included in the remote spectator videos designated as non-display, based on the non-display spectator information stored in the non-display spectator storage unit 134 (step S205).

When a determination is made that the remote spectator video designated as non-display is not included, the remote spectator video output content determination unit 115 stores a display position determination result in step S204 above as output content data in the output content storage unit 136 (step S206). That is, the remote spectator video output content determination unit 115 stores, in the output content storage unit 136, data indicating which remote spectator video is output at which positions on the display screen 104A based on the display position determination result.

The remote spectator video output unit 116 causes the plurality of remote spectator videos to be displayed on the remote spectator video display apparatus 104 according to the output content data stored in the output content storage unit 136 (step S207).

Thereafter, the server apparatus 1 determines whether the event has ended (step S208). When a determination is made that the event has not yet ended, the server apparatus 1 proceeds to the processing of step S201. Thus, the remote spectator video displayed on the remote spectator video display apparatus 104 is updated each time the certain period of time has elapsed.

When a determination is made in step S201 that there is the non-display spectator designation, the non-display spectator setting unit 113 stores non-display designation spectator information indicating the remote spectator video designated as non-display in the non-display spectator storage unit 134 (step S209). Of course, the number of remote spectator videos designated as non-display is not limited to one. The server apparatus 1 proceeds to the processing of step S201.

When one or more non-display spectator designation is made in this way, a determination is made in step S205 that a non-display designation is included. In this case, the remote spectator video output content determination unit 115 further confirms the value of the excitement level of each remote spectator video indicated by the non-display spectator setting information stored in the excitement level storage unit 135, and determines whether there is a remote spectator video of which the value is equal to or greater than a threshold (step S210). For example, this threshold is set to a value greater than the value y of the excitement level, that is, a value within a range of the value x, making it possible to determine whether or not a state is appropriate for a display of the remote spectator video.

When a determination is made that there is no remote spectator video of which the value of the excitement level is equal to or higher than a threshold, the remote spectator video output content determination unit 115 reflects the non-display designation at the display position determination result in step S204 (step S211). That is, the remote spectator video output content determination unit 115 excludes the remote spectator video designated as non-display from the remote spectator videos to be displayed, and selects the remote spectator video with a high ranking from the remaining remote spectator videos to determine the display position. Thereafter, the remote spectator video output content determination unit 115 proceeds to the processing of step S206 above, and stores the display position determination result reflecting this non-display designation in the output content storage unit 136 as output content data. Thus, the non-display selection content manually designated by the operator of the server apparatus 1 after previous processing performed a certain period of time ago can be reflected at the display position determination result.

When a determination is made in step S210 that there is a remote spectator video of which the excitement level is equal to or greater than the threshold, the remote spectator video output content determination unit 115 cancels the non-display designation for the remote spectator video (step S212). That is, the remote spectator video output content determination unit 115 creates new non-display designation spectator information by excluding remote spectator videos of which the excitement level is equal to or greater than the threshold from the non-display designation spectator information stored in the non-display spectator storage unit 134, and stores the new non-display designation spectator information in the non-display spectator storage unit 134. The remote spectator video output content determination unit 115 proceeds to the processing of step S211 above, and generates a display position determination result by reflecting the remote spectator videos designated as non-display other than the remote spectator videos equal to or greater than the threshold.

When a determination is made in step S208 that the event has ended, the server apparatus 1 ends the processing shown in the flowchart.

Effects

As described above, in the first embodiment, when the server apparatus 1 selects a predetermined number of remote spectator videos to be displayed on the remote spectator video display apparatus 104, which is a video display apparatus installed at the event venue I, from among the plurality of remote spectator videos taken at one or more remote venues R and transmitted via the IP network NW, which is a communication network, the remote spectator video status determination unit 114 analyzes the remote spectator videos and quantifies the excitement level of the remote spectators shown in the remote spectator videos, and the remote spectator video output content determination unit 115 selects the predetermined number of remote spectator videos in descending order of the values of the excitement levels. Thus, since the excitement level of the remote spectators shown in the remote spectator video is quantified, and the predetermined number of remote spectator videos to be displayed are selected in descending order of the value, it is possible to select remote spectator videos with a higher excitement level from among the plurality of remote spectator videos.

The remote spectator video output content determination unit 115 selects remote spectator videos at regular time intervals, and determines positions of the selected remote spectator videos on the display array on the display screen 104A of the remote spectator video display apparatus 104 according to a rule determined based on the selected order of the remote spectator videos, which is stored as the display designation position data at the display position designation data storage unit 132. Therefore, it is possible to select remote spectator videos suitable for display at the point in time at regular time intervals.

Further, in the first embodiment, the server apparatus 1 includes the non-display spectator setting unit 113 that receives a designation input of remote spectator videos as non-display from among the selected remote spectator videos and sets the designated remote spectator video to non-selection. Therefore, it is also possible for the operator of the server apparatus 1 to determine whether the video is suitable for creation of excitement, and manually designate switching between the remote spectator videos to be displayed.

Further, the remote spectator video status determination unit 114 quantifies the excitement level, based on at least one of a motion vector of the remote spectator itself or an object held by the remote spectator, an orientation of the remote spectator, the presence or absence of the remote spectator, and the disturbance or interruption of the remote spectator video. Therefore, it is possible to realize more accurate quantification by quantifying the excitement level based on various viewpoints other than the motion of the object held by the remote spectator, such as the motion of the penlight.

Second Embodiment

Although the remote spectator video displayed on the remote spectator video display apparatus 104 is updated each time a certain period of time has elapsed in the first embodiment, the updating may be performed only when a replacement with a new remote spectator video occurs.

Hereinafter, the same configurations and processing as those in the first embodiment are denoted by the same reference signs as those in the first embodiment, description thereof are omitted, and units different from those the first embodiment will be described.

Figure 6:
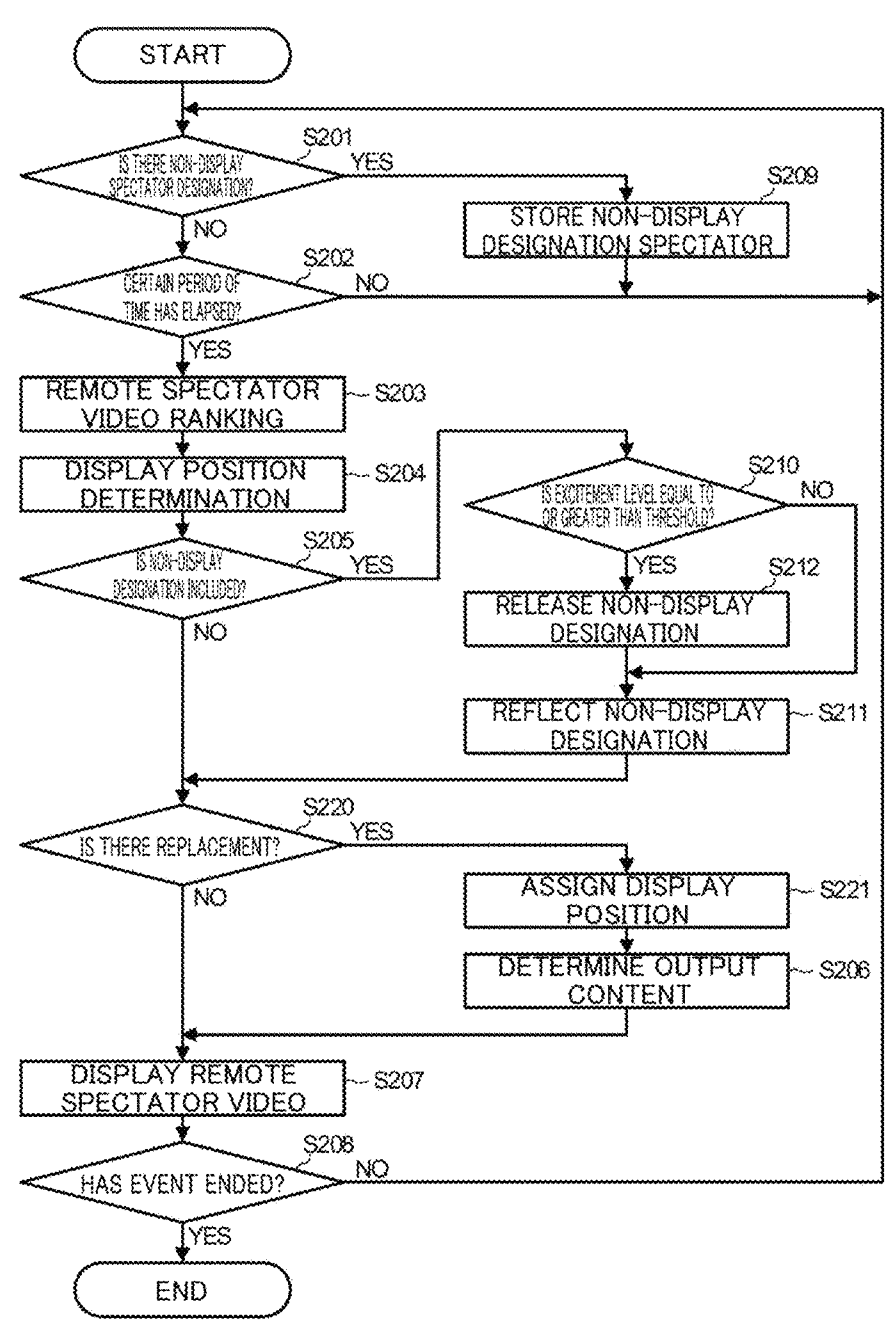
FIG. 6 is a flowchart illustrating a processing procedure and processing content of the remote spectator video output processing in the server apparatus as a display video selection apparatus according to the second embodiment of the present invention.

FIG. 6 is a flowchart illustrating a processing procedure and processing content of the remote spectator video output processing in the server apparatus as the display video selection apparatus according to the second embodiment of the present invention.

In the second embodiment, when a determination is made in step S205 that no non-display designation is included, and following step S211, the remote spectator video output content determination unit 115 determines whether or not there is replacement in a ranking equal to or larger than the number of people desired to be displayed and a ranking smaller the number pf people between the previous processing and the current processing (step S220). For example, the remote spectator video output content determination unit 115 can determine whether or not there is the replacement in the selected remote spectator video by comparing the previous display position determination result performed in step S204 a certain time ago with the display position determination result performed in current step S204, using the output content data stored in the output content storage unit 136. That is, the remote spectator video output content determination unit 115 determines whether or not any remote spectator video has not been selected as a video to be displayed and another remote spectator video has been selected to replace the video.

When a determination is made that there is no replacement, the server apparatus 1 in the second embodiment proceeds to step S207 and causes the remote spectator video display apparatus 104 to display the plurality of remote spectator videos according to the output content data stored in the output content storage unit 136. That is, even when there has been change in ranking from a certain time ago, the arrangement of the remote spectator videos on the display screen 104A is maintained. This makes it possible to prevent a display position of the remote spectator videos of the same remote spectator from changing.

Further, when a determination is made in step S220 that there is the replacement, the remote spectator video output content determination unit 115 assigns display positions (step S221). That is, the remote spectator video output content determination unit 115 sets the remote spectator video of the remote spectator of which the ranking is equal to or smaller than the number of people desired to be displayed to non-display, and performs a designation so that the video of the remote spectator of which the ranking is larger than the number of people desired to be displayed is displayed at an available position. Specifically, when the 25 videos are displayed as in the example of FIG. 3 and there are remote spectator videos fallen below top 25 at this time (nth time) among remote spectator videos within the top 25 in terms of excitement level in previous ((n−1)th) processing, the remote spectator video output content determination unit 115 replaces the are remote spectator videos with remote spectator videos within top 25 in the nth time. For example, when (n−1)th and nth rankings are 17th→26th (remote spectator video A) and 27th→23rd (remote spectator video B), remote spectator video B is assigned to a 17th position where remote spectator video A has been displayed. When there are a plurality of remote spectator videos to be replaced, a place with the high (n−1)th ranking is assigned in descending order of the nth ranking.

Thereafter, the remote spectator video output content determination unit 115 proceeds to the processing of step S206 above, and stores the display position determination result reflecting display position replacement in the output content storage unit 136 as the output content data.

Effects

As described above, in the server apparatus 1 of the second embodiment, the remote spectator video output content determination unit 115 does not change the display array on the video display apparatus when the remote spectator video continues to be selected even when the value of the excitement level of the remote spectator video changes from the value of the excitement level a certain time ago. This makes it possible to prevent a display position of the remote spectator videos of the same remote spectator from changing.

Further, when the value of the excitement level of the remote spectator video changes from that value of the excitement level certain time ago and the remote spectator video is not selected, the remote spectator video output content determination unit 115 disposes a newly selected remote spectator video at the position on the display array in which the remote spectator videos that have not been selected are disposed. Therefore, only when there is a replacement, it is possible to replace and display the remote spectator video only at the display position where there has been the replacement.

Other Embodiments

A flow of each processing described with reference to the flowchart is not limited to the described processing procedure. An order of some steps may be replaced, or some steps may be performed simultaneously in parallel. Further, process content of some steps may be modified.

Further, the server apparatus 1 may be realized by a single apparatus as described in the above example, or may be realized by a plurality of devices with distributed functions.

Further, the information processing program according to each embodiment and the scheme described in other embodiments can be stored as a processing program (software means) that can be executed by a computer in a recording medium such as a magnetic disk (floppy (a registered trademark) disk, a hard disk, or the like), an optical disc (a CD-ROM, a DVD, a MO, or the like), or a semiconductor memory (a ROM, a RAM, a flash memory, or the like), and can also be transferred and distributed via a communication medium. The program stored on the medium also includes a setting program for causing a software means (including not only an execution program but also a table and a data structure) to be constructed in the computer. The computer that realizes the present apparatus executes the above-described processing by reading the program recorded on the recording medium, constructing the software means using the setting program in some cases, and controlling an operation through the software means. The recording medium referred to in the present specification is not limited to that for distribution, but also includes a storage medium such as a magnetic disk or a semiconductor memory provided inside the computer or in a device connected via the IP network NW.

In short, the present invention is not limited to the embodiment as it is, and the components can be modified and embodied without departing from the gist of the invention in an implementation stage. Further, various inventions can be formed through appropriate combinations of a plurality of components disclosed in the embodiment. For example, some components may be deleted from all of the components shown in the embodiment. Further, components from different embodiments may be appropriately combined.

REFERENCE SIGNS LIST

1 Server apparatus
2 Remote terminal
11 Control unit
12 Program storage unit
13 Data storage unit
14 Communication interface
15 Input and output interface
21 Monitor
22 Speaker
23 Camera
101 Input and output apparatus
102 Video capturing apparatus
103 Audio recording apparatus
104 Remote spectator video display apparatus
104A Display screen
111 Event video distribution unit
112 Remote spectator video reception unit
113 Non-display spectator setting unit
114 Remote spectator video status determination unit
115 Remote spectator video output content determination unit
116 Remote spectator video output unit
131 Learned data storage unit
132 Display position designation data storage unit
133 Remote spectator video storage unit
134 Non-display spectator storage unit
135 Excitement level storage unit
136 Output content storage unit
I Event venue
NW IP network
R, $R_1$, $R_2$, . . . , $R_n$ Remote venue
S Event video display system

The invention claimed is:

1. A display video selection apparatus for selecting a predetermined number of remote spectator videos to be displayed on a video display apparatus at an event venue from among a plurality of remote spectator videos taken at one or more remote venues and transmitted via a communication network, the display video selection apparatus comprising:

video status determination circuitry configured to analyze the remote spectator videos and quantify the excitement level of the remote spectators shown in the remote spectator video; and video output content determination circuitry configured to select the predetermined number of remote spectator videos in descending order of values of the excitement levels.

2. The display video selection apparatus according to claim 1, wherein the video output content determination circuitry:

selects the remote spectator video at regular time intervals, and determines a position of the selected remote spectator video on the display array of the video display apparatus according to a rule determined by the selected order.

3. The display video selection apparatus according to claim 2, wherein;

the video output content determination circuitry does not change the display array on the video display apparatus when the remote spectator video continues to be selected even when the value of the excitement level of the remote spectator video changes from the value of the excitement level a certain time ago.

4. The display video selection apparatus according to claim 3, wherein:

when the value of the excitement level of the remote spectator video changes from the value of the excitement level a certain time ago and the remote spectator video is not selected, the video output content determination circuitry disposes a newly selected remote spectator video at the position on the display array at which the remote spectator videos that have not been selected are disposed.

5. The display video selection apparatus according to claim 1, further comprising:

non-display spectator setting circuitry configured to receive an input for designating the remote spectator video as non-display from among the selected remote spectator videos and set the designated remote spectator video to non-selection.

6. The display video selection apparatus according to claim 1, wherein;

the video status determination circuitry quantifies the excitement level based on at least one of a motion vector of the remote spectator itself or an object held by the remote spectator, an orientation of the remote spectator, the presence or absence of the remote spectator, and disturbance or interruption of the remote spectator video.

7. A display video selection method for selecting a predetermined number of remote spectator videos to be displayed at an event venue from among a plurality of remote spectator videos taken at one or more remote venues, the display video selection method comprising:

analyzing the remote spectator videos transmitted via a communication network and stored in a memory, quantifying excitement levels of the remote spectators shown in the remote spectator videos, and storing the quantified excitement levels of the remote spectators in the memory; and selecting the predetermined number of remote spectator videos in descending order of values of the excitement levels stored in the memory.

8. A non-transitory computer readable medium storing a display video selection program for causing a computer to execute the method of claim 7.

* * * * *